US012155614B2

(12) United States Patent
Hassan et al.

(10) Patent No.: US 12,155,614 B2
(45) Date of Patent: *Nov. 26, 2024

(54) COORDINATION OF MESSAGE THREAD GROUPINGS ACROSS DEVICES OF A COMMUNICATION SYSTEM

(71) Applicant: MICROSOFT TECHNOLOGY LICENSING, LLC, Redmond, WA (US)

(72) Inventors: Amer Aref Hassan, Kirkland, WA (US); Mahendra D. Sekaran, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,327

(22) Filed: May 18, 2023

(65) Prior Publication Data

US 2023/0328023 A1 Oct. 12, 2023

Related U.S. Application Data

(63) Continuation of application No. 17/332,921, filed on May 27, 2021, now Pat. No. 11,716,302.

(51) Int. Cl.
*H04L 51/216* (2022.01)
*H04L 51/42* (2022.01)

(52) U.S. Cl.
CPC ............ *H04L 51/216* (2022.05); *H04L 51/42* (2022.05)

(58) Field of Classification Search
CPC ........ H04L 51/16; H04L 51/22; G06F 3/0481
See application file for complete search history.

(56) References Cited

U.S. PATENT DOCUMENTS 11,637,798 B2   4/2023   Hassan
2023/0328022 A1   10/2023   Hassan

OTHER PUBLICATIONS

"Non Final Office Action Issued in U.S. Appl. No. 18/191,739", Mailed Date: Sep. 27, 2023, 13 Pages.
Notice of Allowance mailed on Feb. 12, 2024, in U.S. Appl. No. 18/191,739, 2 pages.
"Final Office Action Issued in U.S. Appl. No. 17/332,958", Mailed Date: May 19, 2023, 30 Pages.
U.S. Appl. No. 17/332,877, filed May 27, 2021.
(Continued)

*Primary Examiner* — Daniel W Parcher
(74) *Attorney, Agent, or Firm* — Newport IP, LLC; Scott Y. Shigeta

(57) ABSTRACT

A system that can coordinate user interface formats having customized threads comprising messages from a common thread. Each client device can be managed by a data structure that defines thread containers, where individual thread containers define threads and topics for each thread. Each thread can also be associated with unique groups of messages. The data structure can cause each client computer to display different user interface formats, with each format showing different threads for each user. Individual devices can control displayed threads according to a topic limit so that displayed messages can be limited for optimizing the use of a display screen and other computing resources. The system provides more granular control of user interface formats to allow users to separate messages of high-priority topics.

20 Claims, 7 Drawing Sheets

(56) References Cited

OTHER PUBLICATIONS

U.S. Appl. No. 17/332,958, filed May 27, 2021.
U.S. Appl. No. 17/333,004, filed May 27, 2021.
U.S. Appl. No. 17/332,991, filed May 27, 2021.
Communication pursuant to Rules 161(1) and 162 EPC Received for European Application No. 22724574.3, mailed on Jan. 9, 2024, 3 pages.
Communication pursuant to Rules 161(1) and 162 EPC Received for European Application No. 22725000.8, mailed on Jan. 9, 2024, 3 pages.
Notice of Allowance mailed on Jan. 10, 2024, in U.S. Appl. No. 18/191,739, 6 pages.

COORDINATION OF MESSAGE THREAD GROUPINGS ACROSS DEVICES OF A COMMUNICATION SYSTEM

PRIORITY APPLICATION

The present application is a continuation of U.S. patent application Ser. No. 17/332,921 filed on May 27, 2021, entitled "COORDINATION OF MESSAGE THREAD GROUPINGS ACROSS DEVICES OF A COMMUNICATION SYSTEM", the content of which application is hereby expressly incorporated herein by reference in its entirety.

BACKGROUND

There are a number of different types of communication systems that allow users to collaborate. For example, some systems allow people to collaborate by sharing meeting chat messages, group chat messages, emails, etc. Although these systems can be useful for allowing users to coordinate and share ideas, some existing systems have a number of drawbacks. For instance, some systems do not organize messages in a way that allows users to optimally manage large amounts of information. When a user has a number of messages within a thread, it may be difficult for a user to monitor all of the messages. This can be particularly difficult when a user has several topics within each chat thread. In some cases, a user may have many topics without a thread and hundreds or thousands of messages with a large number of people. When managing many message threads, users can become unaware of the different topics being discussed and miss important content and tasks.

The aforementioned shortcomings, and others, can lead to an inefficient user interaction model and lead to inefficient use of computing systems. If users miss salient information within a conversation, that causes users to produce redundant messages, prolonged meetings or other duplicated efforts to retrieve and review missed content, which can lead to redundant use of network resources, storage resources, and processing resources.

SUMMARY

The techniques disclosed herein provide a system that can coordinate user interface formats for a number of client devices each displaying customized threads comprising messages from a common thread. Each client device can be managed by the use of a data structure that defines thread containers, where individual thread containers define threads and topics for each thread. Each thread can also be associated with unique groups of messages. The data structure can cause each client computer to display different user interface formats, with each format showing different threads for each user. Each user can independently associate each thread with at least one topic. The system can then associate individual messages of the parent thread with each child thread. The system can provide more granular control of user interface formats to allow users to separate messages of high-priority topics from others, while also allowing for other user interface formats that allow for topics per thread for lower-priority topics. Individual devices can control displayed threads according to a topic limit so that displayed messages can be limited for optimizing the use of a display screen and other computing resources.

In some configurations, a user can initiate a process for splitting a thread and designate one or more topics. In some configurations, users can provide an input that indicates a number of child threads and topics for each thread. This allows each user to build customized user interface formats having specific threads for each topic they choose. Once child threads and their corresponding topics are generated, the system can also select individual messages from the parent thread and associate each message with each child thread based on the related topic. The system can also allow users to select individual messages from the parent thread and associate each message with each child thread.

The techniques disclosed herein can provide a number of technical benefits. For instance, by providing a display of messages that are organized in customized threads that can be unique to each user, a computing device can effectively display information in a format that can allow a granular level of control of how content is organized. In addition, by allowing a system to display messages that are organized in customized threads for each user, the system can more accurately sort messages that are appropriate for each user's needs. Without the ability to generate and manage customized threads for each user, systems are limited to rigid display models that can make it difficult for users to readily view all received messages and potentially miss salient messages.

The disclosed system can also increase the efficiency of a user's interaction with a device. When information is organized more accurately according to a user's needs, a user is less likely to miss salient information. Such benefits can increase the efficiency of a computing system by reducing the number of times a user needs to interact with a computing device to obtain information, e.g., prolonging meetings, retrieving meeting recordings, requesting duplicate copies of previously shared content, etc. Thus, various computing resources such as network resources, memory resources, and processing resources can be reduced.

The efficiencies of the analysis of a select message can also lead to other efficiencies. In particular, by displaying messages more accurately within certain threads having a customized grouping of messages for each user, a system can reduce the number of times a user needs to interact with a computing device to obtain information. This can lead to the reduction of manual data entry that needs to be performed by a user. By reducing the need for manual entry or reducing the need for other inputs that are needed to navigate through a large number of messages within a thread that cannot be split into custom groups, inadvertent inputs and human error can be reduced. This can ultimately lead to more efficient use of computing resources such as memory usage, network usage, or processing resources, since duplicative inputs and corrective inputs will be reduced.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques disclosed herein can provide a number of technical benefits. For instance, by providing a display of messages that are organized in customized threads that can be unique to each user, a computing device can effectively display information in a format that can allow a granular level of control of how content is organized. In addition, by allowing a system to display messages that are organized in customized threads for each user, the system can more accurately sort messages that are appropriate for each user's needs. Without the ability to generate and manage customized threads for each user, systems are limited to rigid display models that can make it difficult for users to readily view all received messages and potentially miss salient messages. Whether information is missed due to a lack of organization of displayed message threads or a system causes a user to spend more time finding that information, prior systems do not provide optimal use of computing resources. The techniques disclosed herein provide a number of technical benefits that can reduce redundant requests for information that is missed when messages are accurately not organized within threads having customized topics. Among other technical effects, the improved user interactions disclosed herein lead to more efficient use of computing resources such as memory usage, network usage, processing resources.

Figure 1:
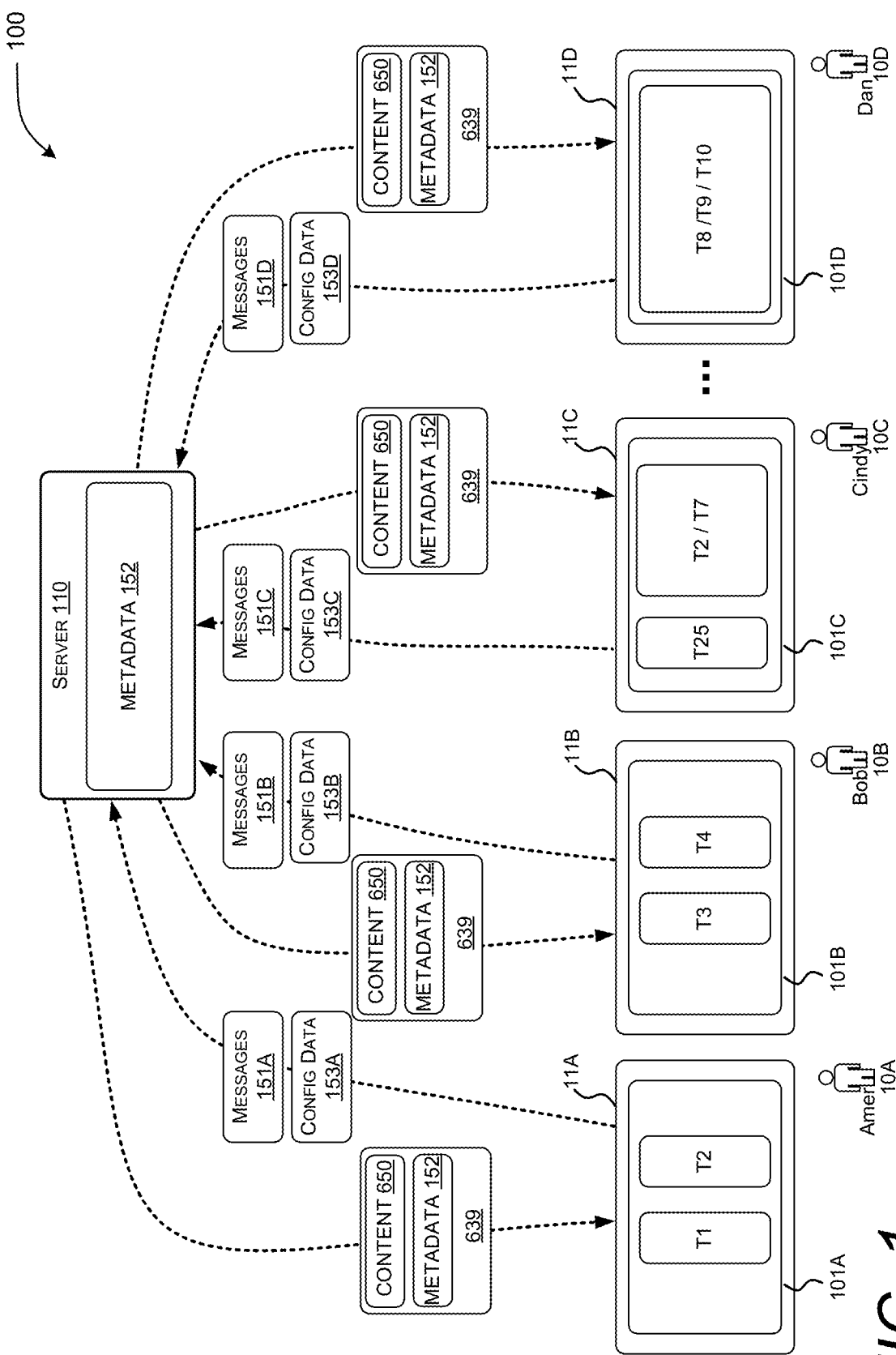
FIG. 1 is a block diagram of a system that can coordinate user interface formats between a number of client devices configured to communicate and displaying messages.

Referring to FIG. 1, aspects of a system 100 are shown and described below. In this example, the system includes individual computing devices 11 and a server 110 configured to exchange messages 151. Individual users 10 are associated with individual computing devices 11 and each computing device 11 can display a user interface 101. In this example, a first user interface 101A is displayed on a screen of a first computing device 11A for a first user 10A. A second user interface 101B is displayed on a screen of a second computing device 11B for a second user 10B. A third user interface 101B is displayed on a screen of a third computing device 11C for a third user 10C, and fourth user interface 101D is displayed on a screen of a fourth computing device 11D for a fourth user 10D.

The server stores metadata 152, also referred to herein as a data structure 152, that defines thread containers, where individual thread containers define threads and topics for each thread. Each thread can also be associated with unique groups of messages. The data structure can cause each client computer 11 to display different user interface formats, with each format showing different threads each having potentially different topics for each user. Each thread can be created from a common parent thread. For instance, in the example of FIG. 1, four users are each participating in a chat with one another. Each person can have their own view of the chat by customizing threads with unique topics. Each customized thread can also be associated with different groups of messages as the messages are exchanged between the client computer 11. The messages exchanged between the client devices can start with a common parent thread and each user can split that parent thread into multiple child threads as shown. The metadata 152 can be configured to store those thread configurations.

In some configurations, the metadata 152 can be communicated to each client computer within communication data 639. The communication data 639 can also comprise include content 650 that can include a number of messages and other data associating each message with a particular topic. In this example, the metadata 152 causes: a first computer 11A to display two threads each pertaining to two different topics, T1 and T2; a second computer 11B to display two threads each pertaining to two topics, T1 and T2, that are different than the topics displayed by the first client computer 11; a third computer 11C to display two threads, with a first thread pertaining to a unique topic, T25, and a second thread that pertains to a combination unique topics, T2 and T7; and a fourth computer 11D to display one thread pertaining to three topics, T8, T9 and T10. By the user of the metadata, each client computer can independently associate each thread with at least one topic. The system can then associate individual messages of the parent thread with each child thread. The system can provide more granular control of user interface formats to allow users to separate messages of high-priority topics from others, while also allowing for other user interface formats that allow for topics per thread for lower-priority topics.

Also shown in FIG. 1, each client can also send messages 151 that are generated by each device. Thus, when a user generates and sends a message, the server 110 can associate those messages with individual threads using the metadata 152 and deliver those messages to each device configured to display a thread associated with a topic to which those messages to which each message corresponds. The clients can also communicate configuration data 153 to the server 110 to allow the server to determine topics that are preferred for each thread. For example, the configuration data 153 can indicate a list of preferred topics of each user and a topic limit for each thread. For instance, by the first client computer 11A, the first user 10A can provide configuration data 153A that indicates a preference of topics to be relating to "hiring" and "human resources" and also indicating that each topic is to be displayed in a thread having a topic limit of one. This configuration data is configured to cause each thread to be displayed with one topic. This allows the system to emphasize high-priority topics for each user.

The topic limit can also be based on one or more capabilities of each client computer 11. For instance, the configuration data 153A for the first device can indicate that the first device is a desktop computer having a screen having a first set of dimensions. The configuration data 153D for the fourth device can indicate that the fourth device is a mobile computer having a screen having a second set of dimensions. The server can then determine if those screen dimensions and/or the device types meet one or more criteria for determining a topic limit for each device. The topic limit may be lower for devices having a smaller form factor, devices having a smaller screen, or for devices having fewer capabilities.

These examples are provided for illustrative purposes and are not to be construed as limiting. It can be appreciated that a topic limit may be increased for the smaller devices depending on user preferences. For instance, a device having a larger form factor may have a reduced topic limit if a user has indicated a high priority for a particular topic or a particular thread. For threads or topics having a threshold priority level, the topic limit may be reduced to help isolate messages for a particular topic when messages of that particular topic are received. Similar factors can be applied to determine a respective topic limit for the other devices.

The system 100 provides a way for one or more computers, such as the server, to generate, store and modify the metadata that can coordinate user interface formats for each computer. When a mobile device, for instance, receives an incoming message, that device can only display the thread to which the incoming message corresponds, but not other parallel subjects. For other users or the same user on a desktop device or larger screen device, the system can cause a display the same message in multi-topic UI format. The data structure can enable coordination on how each device displays the messages even if one user has multiple devices.

In another illustrative example, the data structure defines one or more topic limits which causes some devices to only show a single thread of a topic to which an incoming message corresponds, while other devices show a multi-topic UI format for the same incoming message. In FIG. 1, the fourth device 11D is a mobile phone which has a topic limit, e.g., three, that causes that device to display a thread with three topics. The other devices 11A-11C have other device types or other screen sizes that can cause different topic limits per thread, e.g., the first and second client computers having each thread associated with only one topic, and the third client computer having threads that can display messages pertaining up to two topics.

In some embodiments, messages that are received for an individual topic, can cause the display of a particular thread to which the incoming message corresponds. For example, when the fourth client computer 11D receives a message pertaining to the 10th topic, T10, that thread related to the 10th topic can be displayed.

Figure 2:
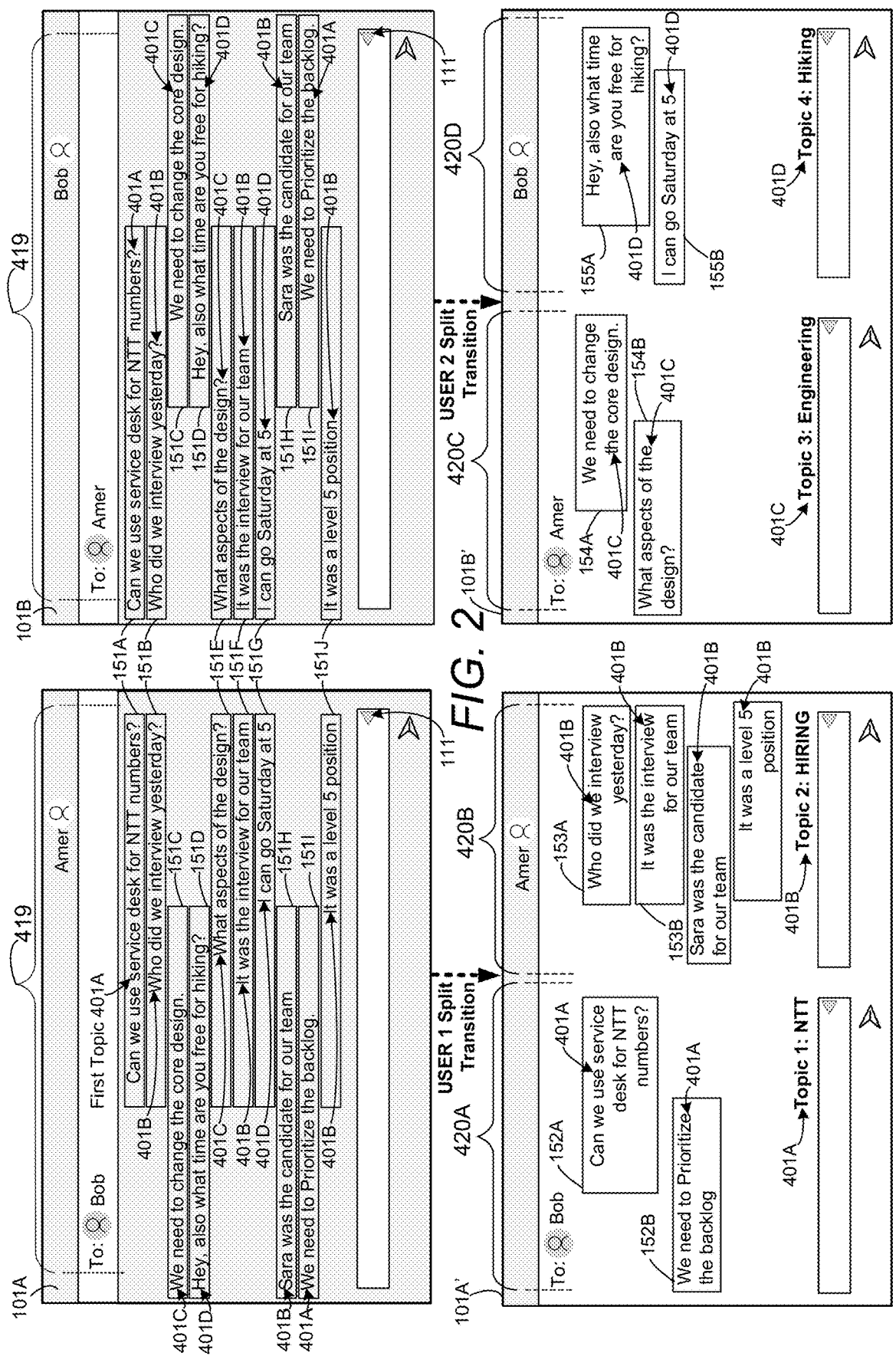
FIG. 2 illustrates an example of a user interface having a parent thread transitioning to updated user interfaces displaying each displaying two child threads created for each user of a message communication system.

Turning now to FIG. 2, features for splitting a parent thread into child threads are shown and described below. In this example, user interfaces 101 for the first and second user start by displaying an original thread 419, also referred to herein as a parent thread 419. As shown in the two user interfaces on the top of FIG. 2, a first user and a second user can view the same parent thread 419 comprising a number of original messages 151. Each message 151 pertains to an individual topic 401. For example, the first message 151A of the parent thread 419 pertains to a first topic 401A, the second message 151B the parent thread pertains to a second topic 401B, the third message 151C pertains to a third topic 401C, etc. Having all of these messages pertaining to different topics in one thread can be confusing and is not optimal for the user, nor is it optimal for the use of computing resources.

To improve the use of computer resources, the system can initiate a split of the parent thread 419. Either user can initiate a split of the parent thread 419. In some configurations, the users can initiate a split of the threads by actuating a user interface element 111. The system can also automatically initiate a process for splitting the original thread with the identification of a number of different topics within each thread.

In response to the initiation of the process to split the parent thread 419, the two user interfaces 101A and 101B can transition to updated user interfaces 101A' and 101B', each of which are shown on the bottom of FIG. 1. As a result of the transition, the updated user interfaces can provide multiple threads. A user can manually initiate a split of a thread and provide individual topics for each child thread. In response to receiving an input at the interface element 111, the system can prompt the user who provided the input to provide text entries of topics for each child thread.

In one illustrative example, consider a scenario where a first user splits the parent thread and provides two designated topics, e.g., NTT and Hiring. After providing those topics, the system divides the messages of the parent thread for each child thread created by the first user. For example, a first group of messages 152 from the parent thread can be associated with the first child thread, NTT; and a second group of messages 153 from the parent thread can be associated with the second child thread, Hiring.

The first user can associate each message 151 of the parent thread with individual child threads by the use of one or more commands including a manual input using a pointing device or a voice input. For instance, the first user can utilize a drag-and-drop feature to associate the first message 151A with the first thread. In other embodiments, the system can perform an analysis of each message and associate individual messages of the parent thread with child threads created by the user. Thus, if the user selects NTT as a topic, the system can utilize one or more technologies to associate that topic with individual messages. In this example, the system can identify keywords related to the topic and associate individual messages of the parent thread with each child thread.

In this example, the first message 151A of the parent thread 419 pertaining to a first topic 401A is associated with the first child thread 420A. The second message 151B of the parent thread 419 pertaining to a second topic 401B is associated with the second child thread 420A, the sixth message 151F of the parent thread 419 pertaining to the second topic 401B is associated with the second child thread 420B, the eighth message 151H of the parent thread 419 pertaining to the second topic 401B is associated with the second child thread 420B, and the nineth message 151I of the parent thread 419 pertaining to the first topic 401A is associated with the first child thread 420A.

The split activity of the first user may be performed independently from the second user. Thus, if the first user splits the thread on the first computing device, the second computing device does not transition to the updated user interface 101B'. The second user is free to split the thread at any time and also is free to split the parent thread into any number of child threads using any number of desired topics. In this illustrative example, the second user also initiates a split of the parent thread 419, and in response, the system generates an updated user interface 101B'. The second user has selected two separate topics that are unrelated to the topics selected by the first user. Specifically, the second user has selected the topics: Engineering and Hiking. After providing those topics, the system divides the messages of the parent thread for each child thread created by the second user. For example, a third group of messages 154 from the parent thread can be associated with the third child thread, Engineering; and a fourth group of messages 155 from the parent thread can be associated with the fourth child thread, Hiking.

Also shown in this example, the second user has associated different messages within the parent thread with the child threads. Specifically, the third message 151C of the parent thread 419 pertaining to a third topic 401C is associated with the third child thread 420C. The fourth message 151D of the parent thread 419 pertaining to a fourth topic 401D is associated with the fourth child thread 420D, the fifth message 151E of the parent thread 419 pertaining to the third topic 401C is associated with the third child thread 420C, and the seventh message 151G of the parent thread 419 pertaining to the fourth topic 401D is associated with the fourth child thread 420D.

In some configurations, the system can automatically associate messages from the parent thread with individual child threads. In some configurations, can be based on keywords or contextual analysis of each message and contextual analysis of the topics of the child threads. In another embodiment, the groupings of certain messages can be based on previous associations with similar topics. For instance, when the second user generates a child thread with the same topic as the first user, that new thread generated by the second user can be associated with a message grouping created by the message grouping created for the first user. For instance, in the above example, if the first user selects the topic NTT, and that first child thread is associated with the first group of messages from the parent thread, e.g., the first message 151A and the ninth message 151I, the system can associate that same group of messages for a child thread created by the second user who selected the same topic, e.g., NTT.

In some configurations, the system can generate criteria that can be used by the system to associate messages from the parent thread with individual child threads. The system can generate a number of keywords or search criteria based on a topic that is selected by a user. In one illustrative example, if the first user generates a child thread with the topic, NTT, the system can generate a number of keywords that are associated with that topic name, e.g., NTT, service, backlog, etc. The system can then select individual groups of messages using those keywords and other search criteria generated in association with those keywords.

Once the child threads are established for a particular user, the system can utilize the topics of a child thread to filter certain messages. For instance, when the first user establishes two different child threads, NTT and Hiring, if the second user sends a new message to the first user pertaining to hiking, the system can filter that message, so it is not displayed in either of the child threads, regarding NTT or Hiring, displayed in the updated user interface 101A'. This filter can be performed by an analysis of the incoming message. If the incoming message does not have a threshold level of relevancy to a particular topic selected by the first user, that message may be filtered.

An alternative embodiment, instead of filtering the messages, the system can provide a notification, e.g., a visual indicator or sound, indicating that an off-topic message has been received. For instance, in the above example, the first user may receive a notification that a message regarding "hiking" has been received. This may be displayed in the form of a temporary message, which may transition to a permanent message if the user accepts that message. In another example, if the second user sends a message regarding hiking to the first user that is currently viewing two threads regarding NTT and Hiring, the system may prompt the user and recommend creating a new thread. If the user confirms that a new thread is to be created, the system can generate a new thread within the user interface and update the metadata. In the present example, if a message regarding hiking was received while the first user is viewing two threads regarding NTT and Hiring, the system may recommend the topic name provided by the second computer sending the message. In response to a user confirmation, the system can generate a third thread for the first user.

Figure 3:
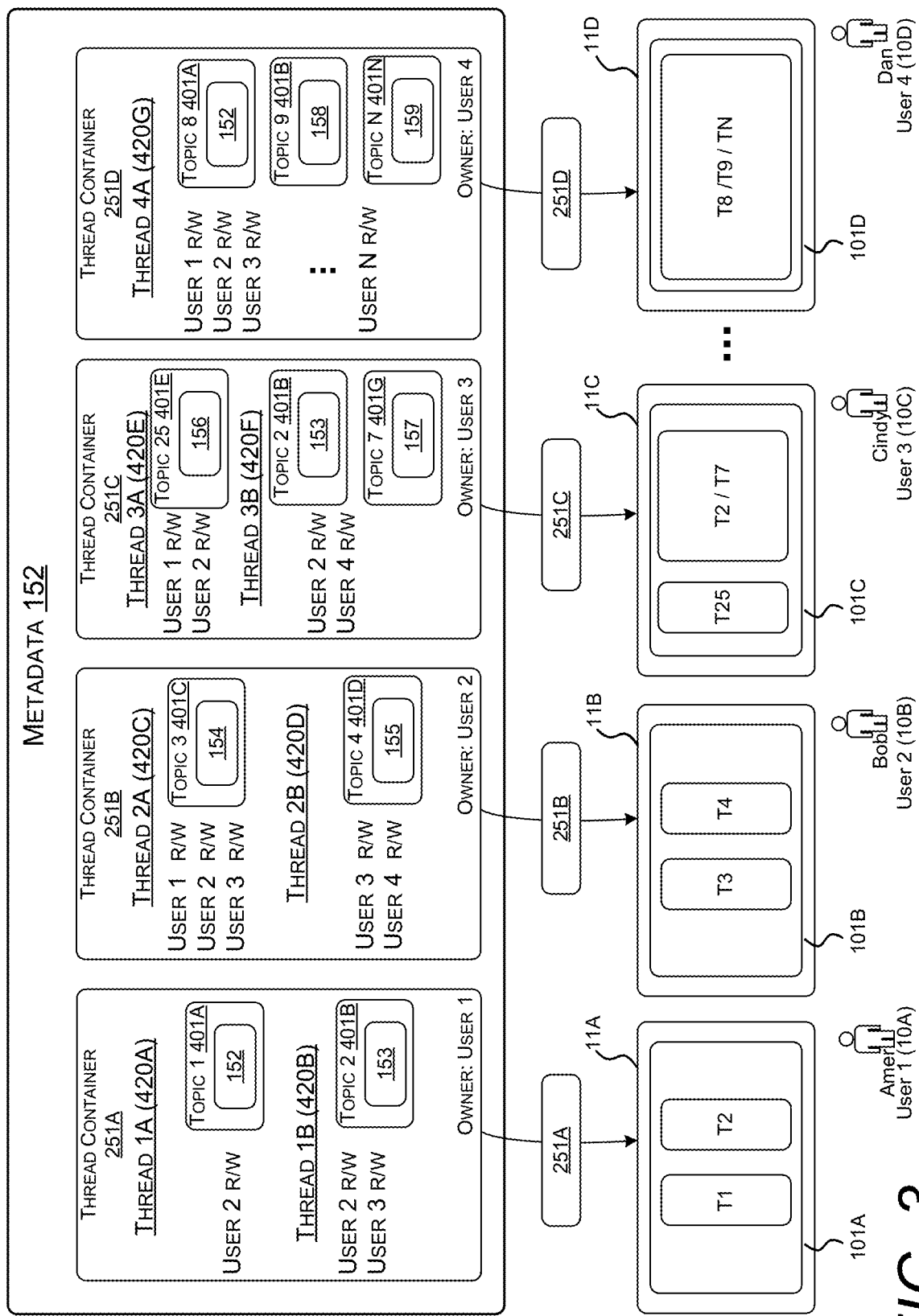
FIG. 3 shows a data structure that can be used by a system to control user interface formats for individual users each having unique message thread formats.

Referring now to FIG. 3, when a parent thread is split, the system also updates the metadata. In one example, responsive to the at least one input causing the split the original thread 419, such as the selection of the UI element 111, the system can cause the generation of metadata 152 defining a first thread container 251A for a first user 10A and a second thread container 251B for a second user 10A. The first thread container 251A can define the first thread 420A comprising a first set of messages 152 pertaining to the first topic 401A, the first thread container 251A further defining the second thread 420B comprising of a second set of messages 153 pertaining to the second topic 401B. The second thread container 251B can be configured to define the third thread 420C comprising a third set of messages 154 pertaining to the third topic 401C, the second thread container 251B further defining a fourth thread 420C comprising the fourth set of messages 155 pertaining to the fourth topic 401D.

Other topics defined by the third and fourth users can be associated with different topics, some of which can overlap with one another. In addition, these containers store data that can identify individual groups of messages 156-159 for each topic. Thus, message and thread alignments can be maintained between users that are managing thread having the same topic. For instance, if the first user and the fourth user are both viewing threads pertaining to the first topic 401A, when the fourth user sends a message on that topic, that message is sent to the correct thread for the first user. This can be achieved in a number of ways. For instance, each message can be sent with metadata identifying a related topic of that message.

By providing these definitions within thread containers, individual thread containers or other portions of the metadata can be communicated to individual clients from a server allowing the server to control how each client computer is to display the message data. Also shown, the metadata can also comprise other containers for other users. In this case, the third user has elected to view topic 25 as a standalone topic within a fifth thread 420E, and view topic 2 and topic 7 together within a thread, the sixth thread 420F. Similarly, the fourth user has elected to view three topics, e.g., the eighth, ninth and nth topics, within a single thread 420G. Correspondingly, when the metadata is communicated to each client device, each client device can generate a user interface format that conforms to the metadata. Each computer receiving the metadata can also determine a limit of topics per thread as well as permissions for each user. The permission can allow users to read and write to threads on a per thread, per user, and per topic basis.

Figure 4:
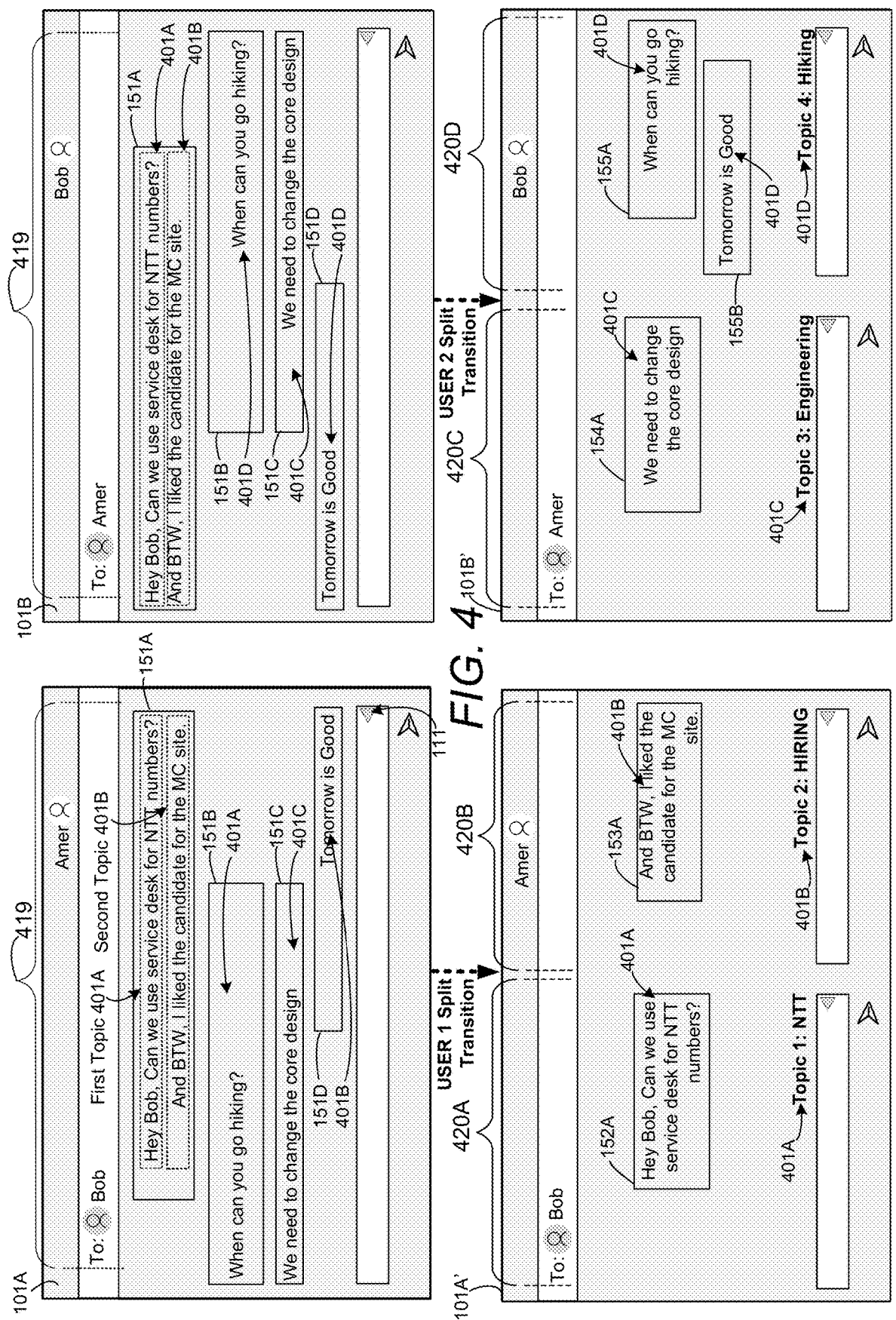
FIG. 4 illustrates an example of a user interface having a parent thread transitioning to updated user interfaces displaying each displaying two child threads created for each user of a message communication system, where the split of the original thread involves an intra-message split.

Referring now to FIG. 4, another example of a split process involving a split of a single message of a parent thread is shown and described. In this example, each user can generate independent child threads from a parent thread. Prior to the split of the parent thread 419, the first user 10A and the second user 10B are using their respective computers to send messages to one another. As shown, an original thread 419 comprises a set of messages 151. The system activates a split of the original thread 419 to generate two child threads 420, the first user created the first child thread 420A and the second child thread 420B, and the second user created the third child thread 420C and the fourth child thread 420D. The child threads 420 can include messages 411 having text content from a multi-topic message of the original thread 419, such the first message 151A. As shown, the first message 151A has text content pertaining to multiple topics 401, e.g., a first section of text pertaining to a first topic 401A, e.g., NTT numbers, and a second section of text pertaining to a second topic 401B, e.g., hiring.

In one of the initial stages of a process of splitting a message, the system can cause the first computer 11A to display a user interface 101A comprising an original thread 419 of a plurality of messages 151. A first message 151A from the original thread can include text content. In some configurations, the system can analyze the text content of a select message, such as the first message 151A, of the original thread 419 determine if the select message has multiple topics, e.g., identify at least a first topic 401A and a second topic 401B within the text content of the select message of the messages 151 of the original thread 419. For illustrative purposes, a first text portion of a select message, e.g., the first message 151A, of the original thread 119 is associated with the first topic 401A and a second text portion of the select message 151A is associated with the second topic 401B. The analysis can be automatic, or it can be in response to a user input, e.g., an input at the interface element 111.

The analysis of the text to determine topics within a message can be based on any suitable technology. In some configurations, the analysis to determine topics within a message can be based on the presence of predetermined words or predetermined word combinations that are in a single message. In some configurations, the analysis to determine topics within a message can also be based on the presence of word categories. In one illustrative example, predetermined nouns or verbs found within a message can be identified as a topic candidate. Predetermined words can also be categories of words like team names, product names, etc. Thus, any of the predetermined words, which may be retrieved from a database, can be used to identify topics within a message. Text in a predetermined format can also be selected as a topic candidate. For example, words in all cap characters or words in bold text may be selected as a topic candidate.

In some configurations, predetermined keywords that are found within a select message can be identified as a topic candidate. Keywords can be stored in a database and aligned with, or labeled as, a topic. The database can also maintain scores for each keyword and/or topic. When a keyword is identified in a message, a topic candidate can be selected. Topic candidates can also be selected using the other techniques disclosed herein. The topic candidates can be scored and ranked, and topic candidates having a threshold score, e.g., a threshold priority, can be selected as a topic for a child thread.

The system can also select text portions of a message and associate each portion with a particular topic. The text portions may be selected based on punctuation, text spacing, or the position of some text characters. In the example of FIG. 4, based on the punctuation, the system can determine that there are two sentences. Each sentence can be analyzed to derive a topic candidate for each portion of text. For illustrative purposes, consider a scenario where the text is analyzed, and the system determines that the first sentence within the select message 151A pertains to a first topic 401A and a second sentence within the select message 151A pertains to a second topic 401B. In such an example, certain keywords, such as the subject of a phrase can be selected as a topic candidate, such as NTT, for the first topic 401A. In another example, a topic candidate can be selected from a list of topics that are associated with keywords. In such an example, the system can identify one or more keywords within a message, such as "candidate," and automatically select a topic candidate, such as "hiring," based on that keyword. If the topic candidate meets one or more criteria, such as a topic candidate having a priority threshold, that type of topic candidate can be selected as a topic for a new thread. This example is provided for illustrative purposes and is not to be construed as limiting. It can be appreciated that any suitable technology for identifying a topic within a collection of text can be utilized with the techniques disclosed herein.

If the system determines that two topic candidates of a single message are related, e.g., the topic candidates are the same or they are synonymous to a threshold degree, the system may determine that the associated message is a single-topic message. Such a determination can be made by scoring each topic candidate. For example, if a select message has a first portion, e.g., a first sentence, with the word "candidate" and another portion with the word "resume," a first score can be associated with a word such as "candidate" and another score can be associated another word such as "resume." These scores may indicate a threshold level of likeness given that they are both related to hiring. Thus, when a system detects a message having two portions with these two keywords having a threshold level of likeness, the system may not generate new child threads.

When a system detects a message having two portions with two keywords, and corresponding topic candidates that do not have a threshold level of likeness, the system may generate new child threads for each topic candidate. For example, a word in a first portion of a message, such as "NTT," may be associated with a first score and another word in a second portion of the message, such as "candidate," may be associated with a second score. These scores may not indicate a threshold level of likeness given that they are not related to a similar topic. Thus, a message having two portions with these two words that do not have a threshold level of likeness may be deemed as a multi-topic message. Once a single message is deemed to be a multi-topic message, the system can invoke one or more operations for splitting that message into two or more child threads as well as organizing other messages of the original thread into individual child threads.

In some embodiments, a system can also select one or more messages within the original thread 419 for analysis to determine a topic or for determining the presence of multiple topics. Thus, the system may only analyze select messages meeting one or more criteria. By limiting the number of messages that are analyzed to detect multiple topics, a system may introduce further efficiencies with respect to computing resources. In one example, the system may only select messages having multiple sentences or multiple phrases. In such an example, any message having more than one sentence can be selected for analysis. In another example, the system may select messages that have more than a threshold number of words or characters. In such an example, only messages having more than a threshold number of words or threshold number of characters can be selected for analysis. In other examples, a system may select a message for analysis based on the position of the message within a user interface. This may include a position of a message within a thread or a viewing area, e.g., the last message of a thread or a message that is at the top of a viewing area, may only be selected for analysis. In yet another example, a system may select a message for analysis based on a timestamp or a state associated with the message. In such an example, a most recently received message may be selected for analysis, or a system may only select a message that is recently composed but not sent, etc. In other examples, a system may only select messages that have been received within a predetermined time period, or a system may only select message that have been received outside of a predetermined time period.

Other characteristics of a message, such as a format, can be used to select a message for analysis. This may include a font type, a threshold number of capital letters, threshold number of capital letters per word, or formatting combinations, e.g., a threshold number of characters in bold text, etc. Once a message is selected for analysis, the system determines if the message contains multiple topics. These examples are provided for illustrative purposes and are not to be construed as limiting. The system can utilize any property, condition, state or any combination of factors described herein to determine if a message is to be selected for analysis.

When the system determines that there are two or more topics discovered within a message, the system can initiate a split of the message and the original thread 419 to generate child threads and divide the text content of the message between the generated threads. In some configurations, responsive to the identification of multiple topics, e.g., the first topic and the second topic, within the text content of the original message 151A, the system can cause the user interface 101A shown in the top of FIG. 4 to split the original thread 419 and the original message 151A and transition to an updated user interface 101A' shown at the bottom of FIG. 4. The updated user interface 101A' for the first user that shows a first child thread 420A and a second child thread 420B that is based on the split of the original thread 419. Similarly, a set of child threads, the third child thread 420C and the fourth child thread 420D, that are based on the split of the original thread 419 can be displayed on an updated user interface 101B' to a second user.

The updated user interface for each user can include a first message 152A positioned in a first new child thread 420A and a second message 153B positioned in a second new child thread 420B. The first message 411A can comprise the first text portion of the original message 151A that is associated with the first topic 401A, e.g., "Hey Bob, Can we use service desk for NTT numbers?" In addition, the second message 411B can include the second text portion of the original message 151A that is associated with the second topic 401B, e.g., "And BTW, I liked the candidate for the MC site." Once the child threads are generated, the system can divide the remaining messages of the original thread into each child thread. The message shown in the child threads of the second user can be divided using any one of the techniques disclosed herein.

Figure 5:
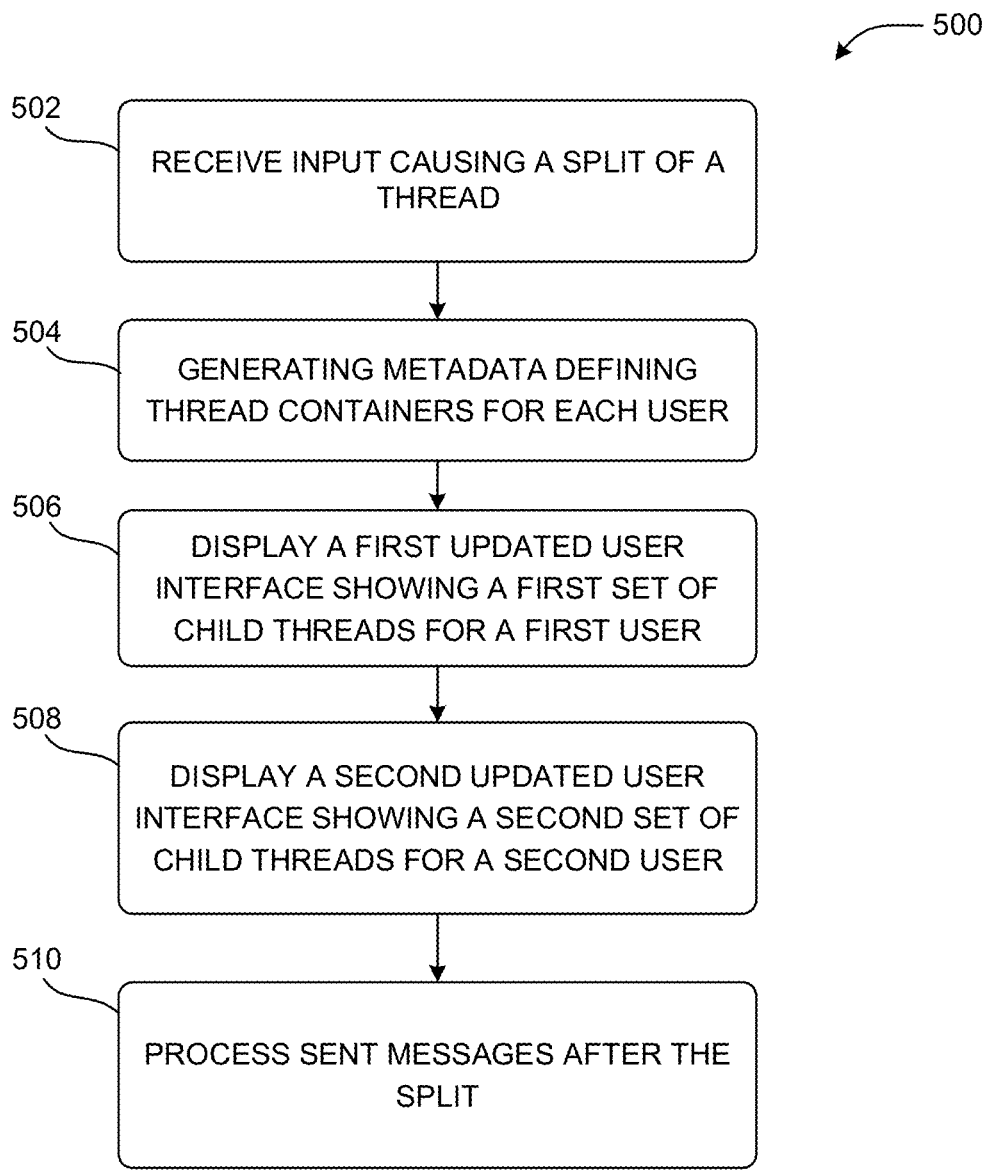
FIG. 5 is a flow diagram showing aspects of a routine for generating, coordinating and displaying customized threads comprising messages from a common thread.

FIG. 5 is a diagram illustrating aspects of a routine 500 for enabling users to split message threads into child message threads and manage thread formats between a number of devices. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 5 and the other FIGURES can be implemented in association with the example presentation user interfaces UI described above. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 500 includes an operation 502 where the system can receive at least one input causing a split of the original thread 419 of original messages 151 to generate a first thread 420A pertaining to a first topic 401A and a second thread 420B pertaining to a second topic 401B for a first user 10A, and a third thread 420C pertaining to a third topic 401C and a fourth thread 420D pertaining to a fourth topic 401B for a second user. An example of this process is shown in FIG. 2. The two upper UIs show an original thread 419 shared by two users. Either user can invoke a split and each user can have two unique and independent topics. The two lower UIs show threads created by the split for each user, a first topic and a second topic for User 1; and a third topic and a fourth topic for User 2. The topics can be user selected or computer selected.

In some configurations, the system can receive inputs from each user to split their respective view of a parent thread at different times, e.g., user split activity can be independent of one another. Thus, in operation 502, the at least one input can comprise a first input provided by the first user at the first computing device, wherein the first input causes the generation of the metadata defining the first thread container. The at least one input can also include comprises a second input provided by the second user at the second computing device, wherein the second input causes the generation of the metadata defining the second thread container, wherein the first input and the second input are provided independently at different times.

Next, at operation 504, responsive to the at least one input causing the split the original thread 419, the system can cause a generation of metadata 152 defining a first thread container 251A for a first user 10A and a second thread container 251B for a second user 10A. The first thread container 251A defining the first thread 420A comprising a first set of messages 152 pertaining to the first topic 401A, the first thread container 251A further defining the second thread 420B comprising of a second set of messages 153 pertaining to the second topic 401B, the second thread container 251B defining the third thread 420C comprising a third set of messages 154 pertaining to the third topic 401C, the second thread container 251B further defining a fourth thread 420C comprising the fourth set of messages 155 pertaining to the fourth topic 401D.

An example of operation 504 is shown in FIG. 3. This can include a data structure 152, or metadata 152, for storing the split configuration for each person is generated, which keeps track of the state of each user. The metadata defining thread containers for each user and keeping track of the topics for each thread. User 1 has two threads for topics 1 & 2, User 2 has two threads for topics 3 & 4 each user can configure any arrangement of topics.

In some configurations, the system can analyze individual messages of the parent thread to determine if an individual message comprises content relating to two or more topics. If it is determined that an individual message comprises two or more topics, the system may initiate operation 504, e.g., the system may initiate a process for splitting the original thread response to determining that an individual message comprises at least two topics. Thus, a thread can be split by a number of different computer actions, including a user input, the detection of two or more topics within the original thread, or the detection of two or more topics within the individual message.

In some embodiments, a system can also select one or more messages within the original thread 419 for analysis. Thus, the system may only analyze select messages meeting one or more criteria. By limiting the number of messages that are analyzed to detect multiple topics, a system may introduce further efficiencies with respect to computing resources. In one example, the system may only select messages having multiple sentences or multiple phrases. In such an example, any message having more than one sentence can be selected for analysis. In another example, the system may select messages that have more than a threshold number of words or characters. In such an example, only messages having more than a threshold number of words or threshold number of characters can be selected for analysis. In other examples, a system may select a message for analysis based on the position of the message within a user interface. This may include a position of a message within a thread or a viewing area, e.g., the last message of a thread or a message that is at the top of a viewing area, may only be selected for analysis. In yet another example, a system may select a message for analysis based on a timestamp or a state associated with the message. In such an example, a most recently received message may be selected for analysis, or a system may only select a message that is recently composed but not sent, etc. In other examples, a system may only select messages that have been received within a predetermined time period, or a system may only select message that have been received outside of a predetermined time period.

Other characteristics of a message, such as a format, can be used to select a message for analysis. This may include a font type, a threshold number of capital letters, threshold number of capital letters per word, or formatting combinations, e.g., a threshold number of characters in bold text, etc. Once a message is selected for analysis, the system determines if the message contains multiple topics. These examples are provided for illustrative purposes and are not to be construed as limiting. The system can utilize any property, condition, state or any combination of factors described herein to determine if a message is to be selected for analysis.

Once an individual message is selected for analysis, the system can utilize any suitable technology for identifying multiple topics within the message. In addition, the analysis can also generate recommended topic candidates to provide the user with a suggestion of topic names for each child thread. In some configurations, the analysis to determine the presence of multiple topics within a message or multiple topics within a thread can be based on the presence of predetermined words or predetermined word combinations that are in a single message. In some configurations, the analysis to determine topics within a message can also be based on the presence of word categories. In one illustrative example, predetermined nouns or verbs found within a message can be identified as a topic candidate. Predetermined words can also be categories of words like team names, product names, etc. Thus, any of the predetermined words, which may be retrieved from a database, can be used to identify topics within a message. Text in a predetermined format can also be selected as a topic candidate. For example, words in all cap characters or words in bold text may be selected as a topic candidate.

In some configurations, predetermined keywords that are found within a select message can be identified as a topic candidate. Keywords can be stored in a database and aligned with, or labeled as, a topic. The database can also maintain scores for each keyword and/or topic. When a keyword is identified in a message, a topic candidate can be selected. Topic candidates can also be selected using the other techniques disclosed herein. The topic candidates can be scored and ranked, and topic candidates having a threshold score, e.g., a threshold priority, can be selected as a topic for a child thread. Any topic identified within a message can be recommended to the user as a name for a particular child thread. The user can then confirm the name or provide another name of a topic for a child thread.

Next, at operation 506, responsive to the metadata 152 defining the first thread container 251A for the first user, the system can cause a first computing device 11A associated with the first user 10A to render a first user interface 101A displaying the first set of messages 152 in the first thread 420A and the a second set of messages 153 in the second thread 420B, wherein the first set of messages 152 comprises a first portion 151A of content from the original thread 119 pertaining to the first topic 401A, wherein the second set of messages 153 comprises a second portion 151C of content from the original thread 119 pertaining to the second topic 401B. FIG. 2 shows an example UI for User 1 at the lower left corner of the figure.

Next, at operation 508, responsive to the metadata 152 defining the second thread container 251B for the first user, the system can cause a second computing device 11B associated with the second user 10B to render a second user interface 101B displaying the third set of messages 154 in the third thread 420C and the a fourth set of messages 155 in the fourth thread 420D, wherein the third set of messages 154 comprises the first portion 151A of content from the original thread 119 pertaining to the third topic 401C, wherein the fourth set of messages 155 comprises the second portion 151C of content from the original thread 119 pertaining to the fourth topic 401B. FIG. 2 shows an example UI for User 2 at the lower right corner of the figure.

In some configurations, the system can select the same group of messages for the second user if the second user selects the same topic as the first user. For instance, in the operations described herein, the system can determine that the fourth topic has a threshold level of relevancy to the second topic. For instance, if the first user selects a topic of "sales" for a child thread, and later, the second user selects a topic of "sale performance," e.g., the two topics have a threshold level of relevancy, the system can determine that the group of messages to be associated with the child thread of the second user is based on the group of messages that are associated with the child thread of the first user. A threshold level of relevancy can include a number of factors, such as the detection of common words between topics or the detection of synonyms between topics, etc. this process can also cause a system more efficient and that the processing required for selecting a group of messages for a particular thread can be leveraged for two users that have the same topic instead of having the system select messages for each thread.

Next, at operation 510, the system can process messages for each split thread. Specifically, operation 510 can involve processing of messages that are sent after at least one user splits the parent thread. For example, users that are working with computing devices displaying the original parent thread can send a message to a user who has split their user interface to child threads having specific topics. If the message pertains to those particular topics associated with each child thread, the message can be sent from the first user interacting with the original parent thread to another user interacting with an updated user interface displaying the child thread. However, if the message does not pertain to the topics of the child thread, the system can filter the messages, and prevent the messages from being delivered to the recipient. This filter helps the user interacting with the customized child threads to only view messages pertaining to high-priority topics.

Routine 500 can also include embodiments where the at least one input comprises a first input provided by the first user at the first computing device, wherein the first input causes the generation of the metadata defining the first thread container, wherein the at least one input comprises a second input provided by the second user at the second computing device, wherein the second input causes the generation of the metadata defining the second thread container, wherein the first input and the second input are provided independently. This enables each user to independently generate their own customized displays at different times. Thus, particular users of a group of users can communicate with each other using the original parent thread while some users can generate the customized child threads.

Figure 6:
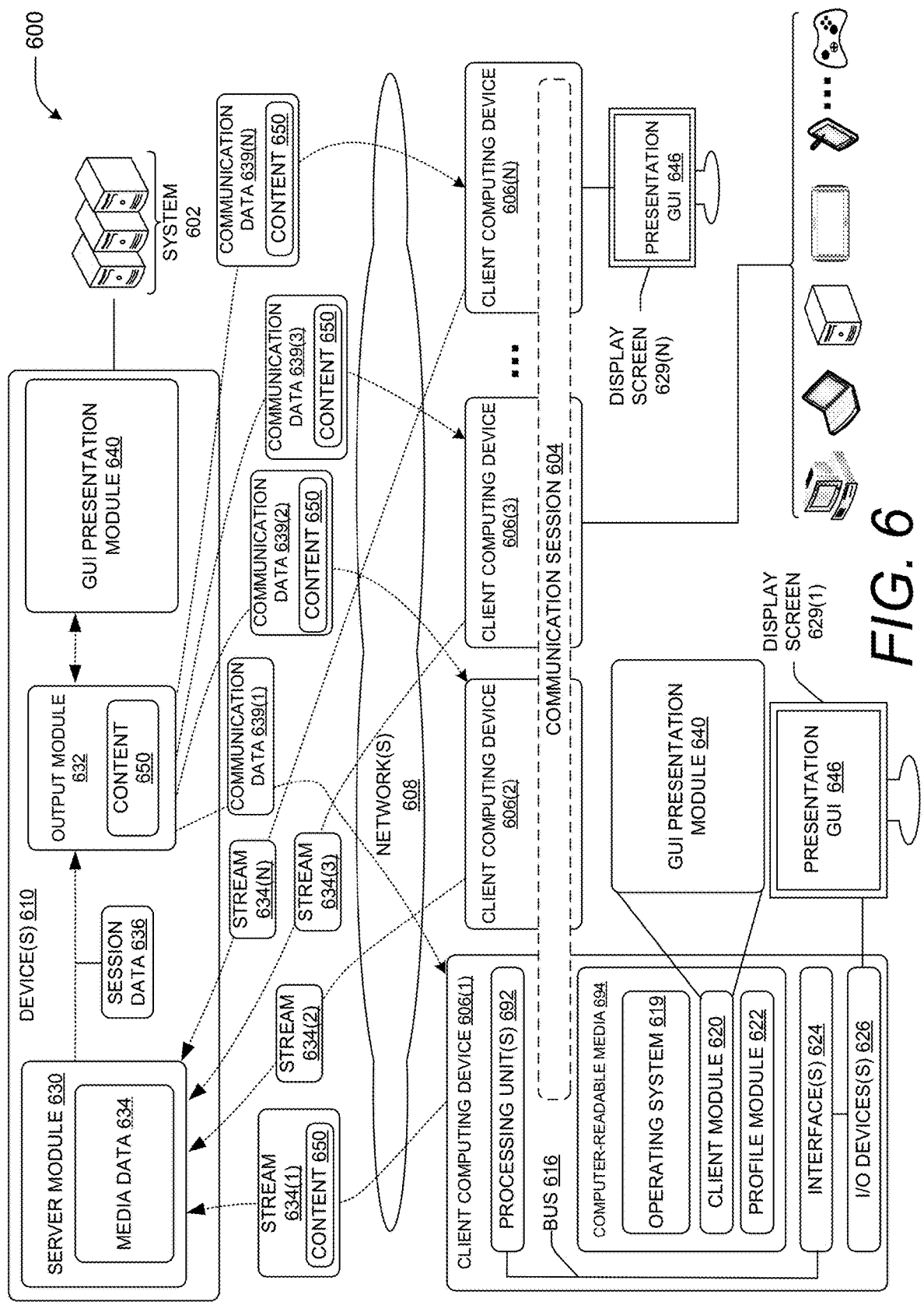
FIG. 6 is a computing system diagram showing aspects of an illustrative operating environment for the techniques disclosed herein.

FIG. 6 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 6 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 6 illustrates that client computing device 606(1) is in some way connected to a display device (e.g., a display screen 629(N)), which can display a UI according to the techniques described herein.

In the example environment 600 of FIG. 6, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 6) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 6, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 7:
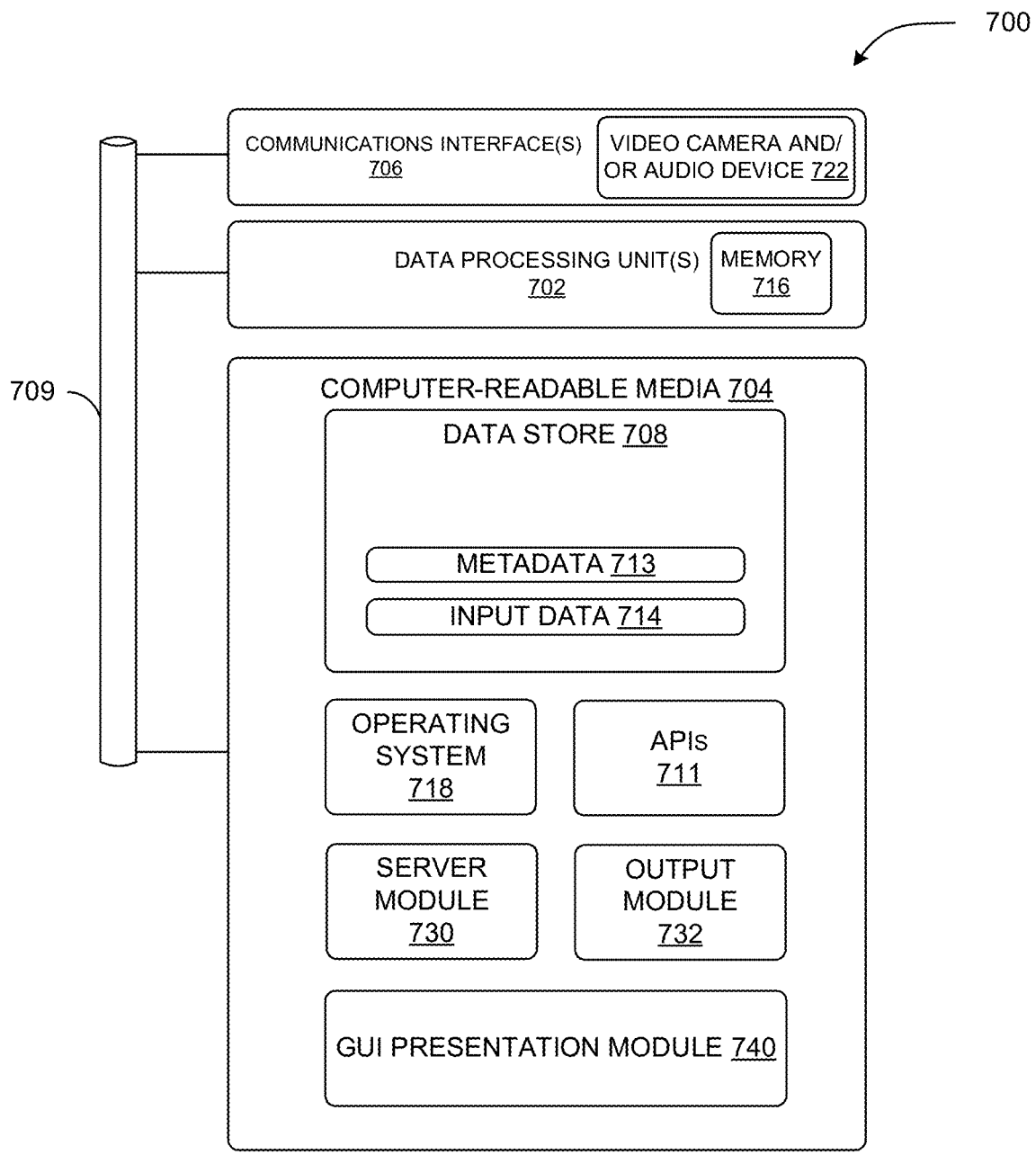
FIG. 7 is a computing architecture diagram showing aspects of the configuration and operation of a computing device that can implement aspects of the techniques disclosed herein.

FIG. 7 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. The device 700 may represent one of any of the devices disclosed herein, e.g., device 606 of FIG. 6, device 11 of FIG. 1, or a server 110/602 of FIGS. 1 and 6.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASIC s"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se. In one example, the computer storage media can be block 704 in FIG. 7 or block 694 in FIG. 6.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704, which can also be storage media, includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data (e.g., session data 636 as shown in FIG. 6), metadata 713 (e.g., the data structure shown in FIG. 5), and/or other data such as input data 714, which can include voice commands, a mouse input, a touch input or other definitions of input gestures. The session data can include a total number of participants (e.g., users and/or client computing devices) in a communication session, activity that occurs in the communication session, a list of invitees to the communication session, and/or other data related to when and how the communication session is conducted or hosted. The data store 708 may also include contextual data, such as the content that includes video, audio, or other content for rendering and display on one or more of the display screens 629. Hardware data 711 can define aspects of any device, such as a number of display screens of a computer. The contextual data can define any type of activity or status related to the individual users 10A-10F each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system for coordinating customized message threads for individual users of a communication session, the system comprising:
   one or more processing units; and
   a computer-readable storage medium having encoded thereon computer-executable instructions to cause the one or more processing units to:
   cause a generation of a data structure defining a first thread container for a first user and a second thread container for a second user, the first thread container comprising a first topic and a second topic, the first thread container defining a first thread comprising a first set of messages pertaining to the first topic, the first thread container further defining the second thread comprising of a second set of messages pertaining to the second topic, the second thread container defining a third thread comprising a third set of messages pertaining to a third topic, the second thread container comprising the third topic and a fourth topic, the second thread container further defining a fourth thread comprising a fourth set of messages pertaining to the fourth topic;
   responsive to the data structure defining the first thread container comprising the first topic and the second topic:
   determine a first topic limit associated with the first computing device, wherein the first topic limit limits a number of displayed topics for each thread displayed on the first computing device based on capabilities of the first computing device; and
   cause the first computing device to render, subject to the first topic limit, a first user interface displaying the first topic and the second topic, the first set of messages in the first thread, and the second set of messages in the second thread, wherein the first set of messages comprises content pertaining to the first topic, wherein the second set of messages comprises content pertaining to the second topic; and
   responsive to the data structure defining the second thread container comprising the third topic and the fourth topic:

determine a second topic limit associated with the second computing device, wherein the second topic limit limits a number of displayed topics for each thread displayed on the second computer device and the second topic limit is greater than the first topic limit based on the capabilities of the second computing device; and cause a second computing device to render, subject to the second topic limit, a second user interface displaying the third topic and the fourth topic the third set of messages in the third thread, and the fourth set of messages in the fourth thread, wherein the third set of messages comprises content pertaining to the third topic, wherein the fourth set of messages comprises content pertaining to the fourth topic.

2. The system of claim 1, wherein the instructions further cause the one or more processing units to: determine a first topic limit for the first computing device and a second topic limit for the second computing device, wherein the first device displays the first set of messages for the first thread and the second set of messages in the second thread, and the second computing device displays the third set of messages for the third thread and the fourth set of messages for the fourth thread, wherein the first topic limit is greater than the second topic limit based on one or more capabilities of each computing device, wherein a number of displayed topics for the first computing device and the second computing device are respectively limited to the first topic limit and the second topic limit.

3. The system of claim 1, wherein the instructions further cause the one or more processing units to: determine a first topic limit for the first computing device and a second topic limit for the second computing device, wherein the first device displays the first set of messages for the first thread and the second set of messages in the second thread, and the second computing device displays the third set of messages for the third thread and the fourth set of messages for the fourth thread, wherein the first topic limit is greater than the second topic limit based on display capabilities of each computing device, wherein a number of displayed topics for the first computing device and the second computing device are respectively limited to the first topic limit and the second topic limit.

4. The system of claim 1, wherein the instructions further cause the one or more processing units to: determine a first topic limit for the first computing device and a second topic limit for the second computing device, wherein the first device displays the first set of messages for the first thread and the second set of messages in the second thread, and the second computing device displays the third set of messages for the third thread and the fourth set of messages for the fourth thread, wherein the first topic limit is greater than the second topic limit based on one or more performance capabilities of each computing device, wherein a number of displayed topics for the first computing device and the second computing device are respectively limited to the first topic limit and the second topic limit.

5. The system of claim 1, wherein the instructions further cause the one or more processing units to: determine a first topic limit for the first computing device and a second topic limit for the second computing device, wherein the first device displays the first set of messages for the first thread and the second set of messages in the second thread, and the second computing device displays the third set of messages for the third thread and the fourth set of messages for the fourth thread, wherein the first topic limit is greater than the second topic limit based on one or more user preferences defining the first topic limit and the second topic limit, wherein a number of displayed topics for the first computing device and the second computing device are respectively limited to the first topic limit and the second topic limit.

6. The system of claim 1, wherein the instructions further cause the one or more processing units to:
receive an incoming message pertaining to a predetermined topic; and
cause a display of the incoming message to the first set of messages of the first thread if the predetermined topic of the incoming message relates to the first topic, wherein the communication system prevents the incoming messages from being displayed in the first thread if the predetermined topic of the incoming message does not relate to the first topic.

7. The system of claim 1, wherein the instructions further cause the one or more processing units to: receive at least one input, wherein the at least one input comprises a first input provided by the first user at the first computing device, wherein the first input causes the generation of the data structure defining the first thread container, wherein the at least one input comprises a second input provided by the second user at the second computing device, wherein the second input causes the generation of the data structure defining the second thread container, wherein the first input and the second input are provided independently.

8. A method for coordinating customized message threads for individual users of a communication session, the method for execution on a system comprising:
causing a generation of a data structure defining a first thread container for a first user and a second thread container for a second user, the first thread container defining a first topic and a second topic, the first thread container defining a first thread comprising a first set of messages pertaining to the first topic, the first thread container further defining the second thread comprising of a second set of messages pertaining to the second topic, the second thread container defining a third thread comprising a third set of messages pertaining to a third topic, the second thread container defining the third topic and a fourth topic, the second thread container further defining a fourth thread comprising a fourth set of messages pertaining to the fourth topic;
responsive to the data structure defining the first thread container comprising the first topic and the second topic:
determining a first topic limit associated with the first computing device, wherein the first topic limit limits a number of displayed topics for each thread displayed on the first computing device based on capabilities of the first computing device; and
causing the first computing device to render, subject to the first topic limit, a first user interface displaying the first topic and the second topic, the first set of messages in the first thread, and the second set of messages in the second thread, wherein the first set of messages comprises content pertaining to the first topic, wherein the second set of messages comprises content pertaining to the second topic; and
responsive to the data structure defining the second thread container comprising the third topic and the fourth topic:
determining a second topic limit associated with the second computing device, wherein the second topic limit limits a number of displayed topics for each thread displayed on the second computer device and the second topic limit is greater than the first topic limit based on the capabilities of the second computing device; and causing a second computing device to render, subject to the second topic limit, a second user interface displaying the third topic and the fourth topic the third set of messages in the third thread, and the fourth set of messages in the fourth thread, wherein the third set of messages comprises content pertaining to the third topic, wherein the fourth set of messages comprises content pertaining to the fourth topic.

9. The method of claim 8, further comprising: determining a first topic limit for the first computing device and a second topic limit for the second computing device, wherein the first device displays the first set of messages for the first thread and the second set of messages in the second thread, and the second computing device displays the third set of messages for the third thread and the fourth set of messages for the fourth thread, wherein the first topic limit is greater than the second topic limit based on one or more capabilities of each computing device, wherein a number of displayed topics for the first computing device and the second computing device are respectively limited to the first topic limit and the second topic limit.

10. The method of claim 8, further comprising: determining a first topic limit for the first computing device and a second topic limit for the second computing device, wherein the first device displays the first set of messages for the first thread and the second set of messages in the second thread, and the second computing device displays the third set of messages for the third thread and the fourth set of messages for the fourth thread, wherein the first topic limit is greater than the second topic limit based on display capabilities of each computing device, wherein a number of displayed topics for the first computing device and the second computing device are respectively limited to the first topic limit and the second topic limit.

11. The method of claim 8, further comprising: determining a first topic limit for the first computing device and a second topic limit for the second computing device, wherein the first device displays the first set of messages for the first thread and the second set of messages in the second thread, and the second computing device displays the third set of messages for the third thread and the fourth set of messages for the fourth thread, wherein the first topic limit is greater than the second topic limit based on one or more performance capabilities of each computing device, wherein a number of displayed topics for the first computing device and the second computing device are respectively limited to the first topic limit and the second topic limit.

12. The method of claim 8, further comprising: determining a first topic limit for the first computing device and a second topic limit for the second computing device, wherein the first device displays the first set of messages for the first thread and the second set of messages in the second thread, and the second computing device displays the third set of messages for the third thread and the fourth set of messages for the fourth thread, wherein the first topic limit is greater than the second topic limit based on one or more user preferences defining the first topic limit and the second topic limit, wherein a number of displayed topics for the first computing device and the second computing device are respectively limited to the first topic limit and the second topic limit.

13. The method of claim 8, further comprising:
receiving an incoming message pertaining to a predetermined topic; and causing a display of the incoming message to the first set of messages of the first thread if the predetermined topic of the incoming message relates to the first topic, wherein the communication system prevents the incoming messages from being displayed in the first thread if the predetermined topic of the incoming message does not relate to the first topic.

14. The method of claim 8, further comprising: receiving at least one input, wherein the at least one input comprises a first input provided by the first user at the first computing device, wherein the first input causes the generation of the data structure defining the first thread container, wherein the at least one input comprises a second input provided by the second user at the second computing device, wherein the second input causes the generation of the data structure defining the second thread container, wherein the first input and the second input are provided independently.

15. A computer-readable storage medium having encoded thereon computer-executable instructions to cause the one or more processing units of a system to:

cause a generation of a data structure defining a first thread container for a first user and a second thread container for a second user, the first thread container comprising a first topic and a second topic, the first thread container defining a first thread comprising a first set of messages pertaining to the first topic, the first thread container further defining the second thread comprising of a second set of messages pertaining to the second topic, the second thread container defining a third thread comprising a third set of messages pertaining to a third topic, the second thread container comprising the third topic and a fourth topic, the second thread container further defining a fourth thread comprising a fourth set of messages pertaining to the fourth topic;

responsive to the data structure defining the first thread container comprising the first topic and the second topic:

determine a first topic limit associated with the first computing device, wherein the first topic limit limits a number of displayed topics for each thread displayed on the first computing device based on capabilities of the first computing device; and cause the first computing device to render, subject to the first topic limit, a first user interface displaying the first topic and the second topic, the first set of messages in the first thread, and the second set of messages in the second thread, wherein the first set of messages comprises content pertaining to the first topic, wherein the second set of messages comprises content pertaining to the second topic; and responsive to the data structure defining the second thread container comprising the third topic and the fourth topic:

determine a second topic limit associated with the second computing device, wherein the second topic limit limits a number of displayed topics for each thread displayed on the second computer device and the second topic limit is greater than the first topic limit based on the capabilities of the second computing device; and cause a second computing device to render, subject to the second topic limit, a second user interface displaying the third topic and the fourth topic the third set of messages in the third thread, and the fourth set of messages in the fourth thread, wherein the third set of messages comprises content pertaining to the third topic, wherein the fourth set of messages comprises content pertaining to the fourth topic.

16. The computer-readable storage medium of claim 15, wherein the instructions further cause the one or more processing units to: determine a first topic limit for the first computing device and a second topic limit for the second computing device, wherein the first device displays the first set of messages for the first thread and the second set of messages in the second thread, and the second computing device displays the third set of messages for the third thread and the fourth set of messages for the fourth thread, wherein the first topic limit is greater than the second topic limit based on one or more capabilities of each computing device, wherein a number of displayed topics for the first computing device and the second computing device are respectively limited to the first topic limit and the second topic limit.

17. The computer-readable storage medium of claim 15, wherein the instructions further cause the one or more processing units to: determine a first topic limit for the first computing device and a second topic limit for the second computing device, wherein the first device displays the first set of messages for the first thread and the second set of messages in the second thread, and the second computing device displays the third set of messages for the third thread and the fourth set of messages for the fourth thread, wherein the first topic limit is greater than the second topic limit based on display capabilities of each computing device, wherein a number of displayed topics for the first computing device and the second computing device are respectively limited to the first topic limit and the second topic limit.

18. The computer-readable storage medium of claim 15, wherein the instructions further cause the one or more processing units to: determine a first topic limit for the first computing device and a second topic limit for the second computing device, wherein the first device displays the first set of messages for the first thread and the second set of messages in the second thread, and the second computing device displays the third set of messages for the third thread and the fourth set of messages for the fourth thread, wherein the first topic limit is greater than the second topic limit based on one or more performance capabilities of each computing device, wherein a number of displayed topics for the first computing device and the second computing device are respectively limited to the first topic limit and the second topic limit.

19. The computer-readable storage medium of claim 15, wherein the instructions further cause the one or more processing units to: determine a first topic limit for the first computing device and a second topic limit for the second computing device, wherein the first device displays the first set of messages for the first thread and the second set of messages in the second thread, and the second computing device displays the third set of messages for the third thread and the fourth set of messages for the fourth thread, wherein the first topic limit is greater than the second topic limit based on one or more user preferences defining the first topic limit and the second topic limit, wherein a number of displayed topics for the first computing device and the second computing device are respectively limited to the first topic limit and the second topic limit.

20. The computer-readable storage medium of claim 15, wherein the instructions further cause the one or more processing units to:
    receive an incoming message pertaining to a predetermined topic; and
    cause a display of the incoming message to the first set of messages of the first thread if the predetermined topic of the incoming message relates to the first topic, wherein the communication system prevents the incoming messages from being displayed in the first thread if the predetermined topic of the incoming message does not relate to the first topic.

\* \* \* \* \*